United States Patent [19]

Hodges et al.

[11] Patent Number: 4,838,643

[45] Date of Patent: Jun. 13, 1989

[54] SINGLE MODE BEND INSENSITIVE FIBER FOR USE IN FIBER OPTIC GUIDANCE APPLICATIONS

[75] Inventors: Leslie B. Hodges; Roger Charlton, both of Roanoke; James H. Bowen, Salem, all of Va.

[73] Assignee: Alcatel NA, Inc., Claremont, N.C.

[21] Appl. No.: 171,979

[22] Filed: Mar. 23, 1988

[51] Int. Cl.⁴ .............................................. G02B 6/22
[52] U.S. Cl. .............................. 350/96.33; 244/3.12; 350/96.10; 350/96.29
[58] Field of Search ............. 350/96.10, 96.20, 96.23, 350/96.29, 96.30, 96.31, 96.33, 96.34; 244/3.1, 3.11, 3.12

[56] References Cited

U.S. PATENT DOCUMENTS

| | | | |
|---|---|---|---|
| 4,354,419 | 10/1982 | Patterson | 244/3.1 X |
| 4,372,647 | 2/1983 | Okamoto et al. | 350/96.33 |
| 4,435,040 | 3/1984 | Cohen et al. | 350/96.33 |
| 4,447,125 | 5/1984 | Lazay et al. | 350/96.30 |
| 4,691,991 | 9/1987 | Unger | 350/96.33 |
| 4,770,492 | 9/1988 | Levin et al. | 350/96.29 |

*Primary Examiner*—John D. Lee
*Attorney, Agent, or Firm*—Peter C. Van Der Sluys

[57] ABSTRACT

A double-clad single mode optical fiber with a depressed inner cladding exhibits increased resistance to attenuation increases resulting from small radius bends and lower attenuation sensitivity to temperature changes when the mode field diameter is less than 7 um and the ratio of the radius of the inner cladding to the radius of the core is at least 6.5 to one.

18 Claims, 1 Drawing Sheet

SINGLE MODE BEND INSENSITIVE FIBER FOR USE IN FIBER OPTIC GUIDANCE APPLICATIONS

BACKGROUND OF THE INVENTION

1. Field of the Invention

This invention relates to single mode optical fibers and more particularly to such optical fibers having reduced loss resulting from small radius bends.

2. Description of the Prior Art

Single mode optical fibers have been designed for and used in the telecommunication industry since about 1980. Single mode optical fibers can offer low attenuation and low dispersion at each of the typical operating wavelengths, namely, 1.3 um and 1.55 um. The bend induced attenuation performance of such designs was compromised to provide for optimal use in a variety of cable structures intended primarily for linear deployment.

It has been observed, however, that if such fibers are subjected to a few bends of small radius, dramatic attentuation increases occur. Similarly, if such fibers are wound under tension on cylinders or bobbins, they exhibit large changes of attenuation with temperature variation. The bend performance of these telephony designs has been compromised to achieve the lowest attenuation at the desired operating wavelengths consistent with low splice loss for linear deployment. Thus, the bend performance of these single mode optical fibers has been sacrificed to provide a structure that may be spliced without experiencing significantly increased splice losses. The mode field diameters of the typical single mode optical fibers used in telecommunications, is in the range of 7.5 to 11.0 um.

A single mode optical fiber has not been made available for use in guidance applications wherein an optical fiber extends from a control station to a moving vehicle and wherein the optical fiber is stored on a cylinder or bobbin and is payed out as the vehicle moves away from the control station.

SUMMARY OF THE INVENTION

The applicants discovered that the requirement in guidance applications that the optical fiber be stored and tightly wound onto the cylinder or bobbin greatly increased the bend attenuation experienced in such applications. As the fiber was payed off from the bobbin at high speeds, a rather sharp bend occurred at the peel point causing considerable bend attenuation. In addition, the portion of the optical fiber still wound on the bobbin exhibited large attenuation changes with temperature variation thereby making the use of such fibers unreliable when such systems were to be used in environments having extremely different temperatures. The difficulty with temperature differences appears to be the result of stresses created in the fiber by changes in bobbin dimension with temperature.

The present invention contemplates a single mode optical fiber, the design of which has been optimized to reduce to an inconsequential level the added losses created by a few small radii bends and to radically reduce the attenuation changes of coiled fiber resulting from temperature changes.

Silica based fiber with germania doped cores can meet the requirements of low loss and dispersion with low added cable splice loss in telecommunication applications; however, such fiber is unsuitable for fiber optic guidance systems.

The applicants have discovered that by reducing the mode field diameter to less than 7 um and increasing the clad to core radius ratio to greater than 6.5:1 losses of less than 0.5 dB can be achieved in a fiber having a bend radius below 3 mm at a wavelength of 1550 nm. The resulting attenuation of such a fiber, if used in a linearly deployed application, as in telecommunications, will not be comparable to the standard telecommunication fiber, but will have greatly superior performance over a wide temperature range, when wound on and deployed from, canisters, bobbins or coils.

Fiber constructed in accordance with the present invention would be unsatisfactory for normal linear deployment in telecommunications applications since it may exhibit higher attenuation and splice losses due to the difficulty experienced in splicing fibers having small mode field diameters. Splicing of such fibers in the field is difficult to achieve and inherently results in high losses. However, for fiber optic guidance applications where the fiber is provided on a canister, bobbin or coil, the splices can be made in the factory under laboratory conditions so as to provide a lower splice loss than when splices are made in the field, as in telecommunications.

An objective of the present invention is to provide a single mode optical fiber having reduced bend sensitivity.

Another objective of the present invention is to provide a single mode optical fiber that exhibits small variations in attentuation caused by temperature changes while the fiber is wound on a canister, bobbin or coil.

Another objective of the present invention is to provide a single mode optical fiber that is uniquely adapted for use in optical fiber guidance applications.

DETAILED DESCRIPTION OF THE PREFERRED EMBODIMENT

Figure 1:
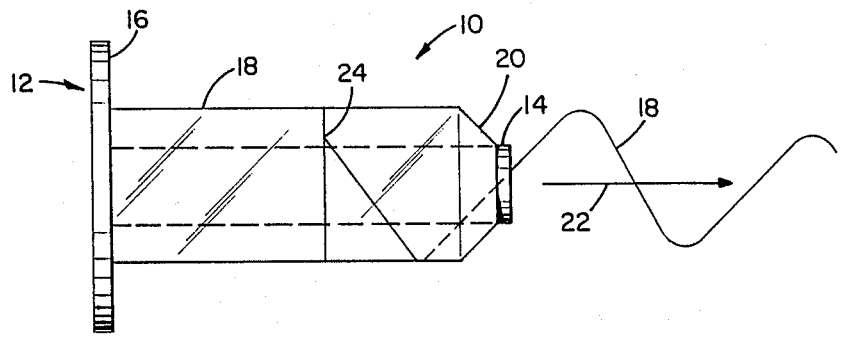
FIG. 1 shows an optical fiber wound on a bobbin adopted for rapid payoff.

Referring to FIG. 1, there is shown an optical fiber assembly 10, including a bobbin 12, having a cylindrical portion 14 and a flange 16 formed at one end thereof. An optical fiber 18 is tightly wound around the cylindrical portion 14 for storage. Typically, the fiber is precision wound onto the bobbin, with adhesive being sprayed on each layer as it is wound, to maintain the fiber in position on the bobbin. Each successive layer of fiber is shorter in length than the prior layer resulting in a tapered end, as is shown at 20.

The fiber is payed out from the bobbin in an axial direction, as shown by arrow 22. The payed out fiber at first follows a helical path which eventually becomes linear at a greater distance from the bobbin.

The applicants' discovered that as the fiber is peeled off the bobbin, a small radius bend is created, as shown at 24. This bend greatly contributed to the increased attenuation experienced when fiber was used in this type of application. The winding of the fiber around the bobbin also contributed to the increased attenuation.

Another discovery of the applicants' was that the wound fiber experienced large changes in attenuation of the wound fiber when the ambient temperature changed greatly. Thus, in the artic, the attenuation was much different than that experienced in an arid environment. This change has been attributed to stresses induced in the fiber by changes in bobbin diameter as the temperature changed.

The applicant therefore established as an objective to reduce the bend induced attenuation as well as the stress induced attenuation.

It is well known in the literature that mode field diameter is the dominant property that controls both micro and macro bending performance (Dixon et al, Proc OFC 1987). It is also known that depressed clad designs suffer an additional bending loss due to coupling to the cladding modes once the modal power encounters the inner to outer cladding boundary (W. A. Reed OFC Conference 88).

The solution to the problem then is to reduce the mode field diameter and increase the radius of the inner cladding relative to the radius of the core. The mode field diameter has been shown by Marcuse (Bell System Tech. Journal 1977) to depend on the product of the core radius and the inverse square root of the refractive index difference between the core and the inner cladding. Thus, reduction of the mode field diameter of a standard telecommunication type fiber could be achieved by reduction of core size or more rapidly by increase of the index difference.

Increase of the index difference can be achieved by increasing the level of germania doping in the core, which in turn will increase the loss due to Rayleigh scattering and move the dispersion minimum to higher wavelengths. These are unattractive options for telecommunication fibers (Lazay, et al, U.S. Pat. No. 4,447,125), but acceptable alternatives in this specific application. This scattering increase can be reduced by reducing the inner cladding refractive index, for example, by codoping with fluorine. However, the lower this cladding index is depressed, the higher the ratio of its radius to that of the core needs to be in order to avoid the bend loss mechanism described above.

This invention then is the choice of a novel balance of the known parameters which influence the performance of a single mode fiber in order to primarily give a low sensitivity to bending.

Figure 2:
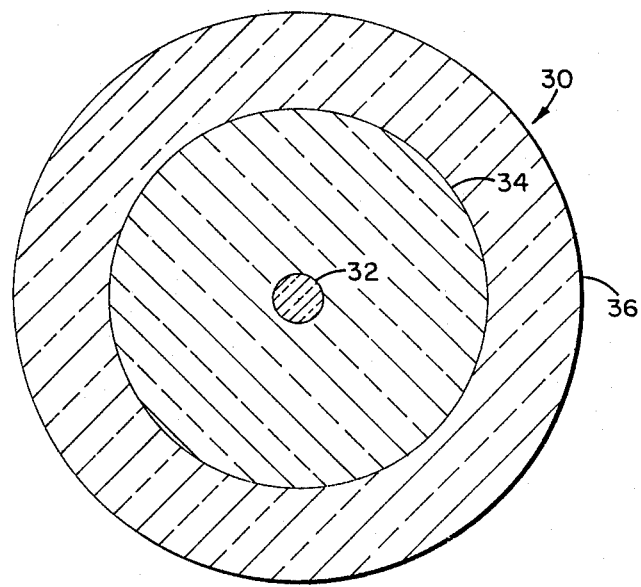
FIG. 2 shows a cross section of a single mode optical fiber.

Referring to FIG. 2, there is shown a cross section of a double clad, single mode fiber 30 having a core 32, a depressed inner cladding 34 and an outer cladding 36. The fiber is silica based with the core being germania doped. The inner cladding is doped with flourine to provide a depressed refractive index less than that of core. The outer cladding is doped to have an index of refraction lying between the indices of refraction of the core and the inner cladding.

An important factor in reducing the bend sensitivity of the fiber is to reduce the mode field diameter to less than 7 um. This is achieved by reducing the physical diameter of the core 32 and by controlling the index of refraction. The mode field diameter is measured using an industry standard EIA method RS455-174. It is desirable that the mode field diameter of the core lie in the range of 5.0 um to 7.0 um with a cutoff wavelength of 1130 nm to 1330 nm as measured by EIA method RS455-80. A second important characteristic is that the radius of the inner cladding 34 be maximized so that the interface between the inner and outer cladding be as remote as possible from the core. It is desirable that the ratio of the maximum radius of the inner cladding to the maximum radius of the core be not less than 6.5:1 and preferably at least 8:1.

The selection of the refractive indices for the core and the two cladding layers should be such that the refractive index of the inner cladding is less than the refractive index of the outer cladding which should be less than the refractive index of the core. The difference, $\Delta+$, between the refractive index of the core and that of the outer cladding given by the formula $$\Delta + = \frac{n_c - n_2}{n_2}$$

wherein $n_c$ equals the refractive index of the core and $n_2$ equals the refractive index of the outer cladding, should lie within the range of 0.75 to 0.95. The difference, $\Delta-$, between the refractive indices of the inner cladding and the outer cladding, given by the formula $$\Delta - = \frac{n_2 - n_1}{n_2}$$

wherein n, equals the refractive index of the inner cladding and $n_2$ equals the refractive index of the outer cladding, should lie within the range of 0.04 to 0.06.

By constructing a fiber having a mode field diameter of less than 7 um, with a inner cladding radius to core radius ratio of greater than 6.5:1, losses of less than 0.5 dB can be achieved in a fiber having a bend radius below 3 mm at a wavelength of 1,550 nm. It has been found that a fiber with the above referenced characteristics will have cutoff wavelength as described by EIA method RS455-80 that lie in the range of 1130 nm to 1330 nm. When the mode field diameter is in the preferable range of 6.0 um to 6.5 um, the cutoff wavelength, as determined by the EIA standard, lies in the range of 1200 nm to 1280 nm.

A fiber, constructed in the accordance with the present invention, having a mode field of $6.0\pm1.0$ um, a cutoff wavelength of $1200\pm70$ nm and a ratio of maximum inner cladding radius to maximum core radius of not less than 6.5:1, was compared with a standard depressed-clad fiber used in the telephony industry, having a mode field of $9.5\pm1.0$ um, a cutoff wavelength of $1200\pm70$ mm and a ratio of inner cladding radius to core radius of 6.0:1 by measuring the attenuation of the fibers at various operating wavelengths and thereafter bending the fibers one quarter turn around mandrels of varying sizes and measuring the increased attenuation resulting from such a bend. The results of the these comparisons are found in Table I.

TABLE I

| | Single-Mode Fiber Bend Loss (dB) | | | | | | |
|---|---|---|---|---|---|---|---|
| | | | MANDREL DIAMETER (INCHES) | | | | |
| TYPE | λ (um) | ATTEN. (dB/km) | 1.0 | 0.75 | 0.50 | 0.25 | 0.125 |
| | | | ATTEN. dB INCREASE | | | | |
| Standard Depressed- Clad Fiber | 1.3 | 0.36 | .01 | .05 | .78 | 7.5 | — |
| | 1.55 | 0.22 | .19 | 1.18 | 4.10 | 11.0 | — |
| Prototype Depressed- Clad Fiber | 0.85 | 3.3 | — | — | — | — | negligible |
| | 1.3 | 0.90 | — | — | — | .01 | .63 |
| | 1.55 | 0.53 | — | — | — | .36 | 4.18 |

As can be seen from a review of Table I, the overall attenuation in dB/km of the prototype fiber, has been increased; however, the bend loss is substantially decreased to a point where no loss could be measured when mandrels in the range of 0.05 to 1 inch were used. The loss for the standard depressed-clad fiber using a mandrel of 0.125 inches diameter was excessively high and therefore not recorded. Thus, from the results shows in Table I, it is apparent that the single mode optical fiber of the present invention would be uniquely suitable for use in optical fiber guidance applications.

The two fibers compared in Table I for bend loss were also compared for attenuation levels at various temperatures. The fibers were first tested for attenuation before being wound on a bobbin. Attenuation readings were taken for wavelengths of 1300 nm and 1550 nm. The fibers were then wound on a bobbin, as previously described. The wound fiber and bobbin were then preconditioned by subjecting them to temperatures of 23° C. and −50° C. The fibers were then tested at 23° C., −32° C. and 60° C. The results are shown in Table II.

TABLE II

Bobbin Wound Single-Mode Fiber Attenuation (dB/km) At Various Temperatures

| TYPE | λ (um) | ATTEN. BEFORE WINDING AT 23° C. (dB/km) | ATTEN. IN dB/km 23° C. | −32° C. | 60° C. |
|---|---|---|---|---|---|
| Standard | 1.3 | 0.48 | 0.58 | 3.03 | 0.53 |
| Depressed-Clad Fiber | 1.55 | 0.46 | 1.08 | 5.03 | 1.14 |
| Prototype | 1.3 | 0.73 | 0.73 | 0.80 | 0.74 |
| Depressed-Clad Fiber | 1.55 | 0.30 | 0.47 | 0.62 | 0.47 |

As can be seen from Table II, the prototype fiber exhibited substantially constant attenuation levels while the standard fiber exhibited wide variations in attenuation, particularly at lower temperatures.

Thus, the present invention provides a fiber that has lower bend attenuation and reduced attenuation changes resulting from temperature differences. The fiber can be uniquely used for fiber optic guidance systems where low bend radius attenuation is required.

What is claimed is:

1. A single mode optical fiber, comprising:
   an inner core region having a refractive index $n_c$ and a maximum radius $r_c$;
   a first inner cladding surrounding said inner core region and having a refractive index $n_1$ and a maximum radius $r_1$; and
   a second outer cladding surrounding said first inner cladding having a refractive index $n_2$, wherein the refractive indices have the following relationship: $n_1 < n_2 < n_c$ and the ratio $r_1:r_c$ is not less than 6.5:1.0.

2. A single mode fiber, as described in claim 1, wherein the ratio $r_1:r_c$ is not less than 8:1.

3. A single mode fiber, as described in claim 2, wherein the difference $\Delta+$ between the refractive indices of the core region $n_c$ and that of the outer cladding $n_2$ is given by $$\Delta + = \frac{n_c - n_2}{n_2}$$

and said difference lies within the range of 0.75 to 0.95 and the difference $\Delta-$ between the refractive indices of the first cladding $n_1$ and the second outer cladding $n_2$ is given by $$\Delta - = \frac{n_2 - n_1}{n_2}$$

and lies in the range of 0.04 to 0.06.

4. A single mode optical fiber, as described in claim 3, wherein the optical fiber exhibits a mode field diameter as defined by EIA method-RS455-174 lying in the range of 5.0 um to 7.0 um and has a cutoff wavelength as defined by EIA method RS455-80 lying in the range of 1130 nm to 1330 nm.

5. A single mode optical fiber, as described in claim 4, wherein the mode field diameter lies in the range of 6.0 um to 6.5 um and the cutoff wavelength lies in the range of 1200 nm to 1280 nm.

6. A single mode optical fiber, as described in claim 1, wherein the mode field diameter as defined by EIA method RS455-174 of said fiber lies in the range of 5.0 um to 7.0 um.

7. A single mode optical fiber, as described in claim 6, wherein the mode field diameter lies within the range of 6.0 um to 6.5 um.

8. A single mode optical fiber, as described in claim 7, wherein the ratio $r_1:r_c$ is not less than 8:1.

9. A single mode optical fiber, as described in claim 6, wherein the ratio $r_1:r_c$ is not less than 8:1.

10. An optical fiber assembly, for use in optical fiber guidance systems, comprising:
    means for storing optical fiber in a wound condition, said means including means for deploying said fiber in an axial direction from said storing means; and
    a single mode optical fiber wound and stored in said storing means, said fiber comprising, an inner core region having a refractive index $n_c$ and a maximum radius $r_c$, a first inner cladding surrounding said inner core region and having a refractive index $n_1$ and a maximum radius $r_1$, and a second outer cladding surrounding said first inner cladding having a refractive index $n_2$, wherein the refractive indices have the following relationship: $n_1 < n_2 < n_c$ and the ratio $r_1:r_c$ is not less than 6.5:1.0.

11. An optical fiber assembly, as described in claim 10, wherein the ratio $r_1:r_c$ is not less than 8:1.

12. An optical fiber assembly, as described in claim 11, wherein the difference $\Delta+$ between the refractive indices of the core region $n_c$ and that of the outer cladding $n_2$ is given by $$\Delta + = \frac{n_c - n_2}{n_2}$$

and said difference lies within the range of 0.75 to 0.95 and the difference $\Delta-$ between the refractive indices of the first cladding $n_1$ and the second outer cladding $n_2$ is given by $$\Delta - = \frac{n_2 - n_1}{n_2}$$

and lies in the range of 0.04 to 0.06.

13. An optical fiber assembly, as described in claim 12, wherein the optical fiber exhibits a mode field diameter as defined by EIA method RS455-174 lying in the range of 5.0 um to 7.0 um and has a cutoff wavelength as defined by EIA method RS455-80 lying in the range of 1130 nm to 1330 nm.

14. A optical fiber assembly, as described in claim 13, wherein the mode field diameter lies in the range of 6.0 um to 6.5 um and the cutoff wavelength lies in the range of 1200 nm to 1280 nm.

15. An optical fiber assembly, as described in claim 10, wherein the mode field diameter as defined by EIA method RS455-174 of said fiber lies in the range of 5.0 um to 7.0 um.

16. An optical fiber assembly, as described in claim 15, wherein the mode field diameter lies within the range of 6.0 um to 6.5 um.

17. An optical fiber assembly, as described in claim 16, wherein the ratio $r_1:r_c$ is not less than 8:1.

18. An optical fiber assembly, as described in claim 15, wherein the ratio $r_1:r_c$ is not less than 8:1.

* * * * *